US012155158B2

(12) United States Patent
Galazin

(10) Patent No.: US 12,155,158 B2
(45) Date of Patent: Nov. 26, 2024

(54) WALL MOUNTING OUTLET EXTENDER

(71) Applicant: TOKA, LLC, Greenwich, CT (US)

(72) Inventor: Tony Matthew Galazin, Greenwich, CT (US)

(73) Assignee: TOKA, LLC, Greenwich, CT (US)

( * ) Notice: Subject to any disclaimer, the term of this patent is extended or adjusted under 35 U.S.C. 154(b) by 99 days.

(21) Appl. No.: 17/420,884

(22) PCT Filed: Jan. 6, 2021

(86) PCT No.: PCT/US2021/012261
§ 371 (c)(1),
(2) Date: Jul. 6, 2021

(87) PCT Pub. No.: WO2021/141952
PCT Pub. Date: Jul. 15, 2021

(65) Prior Publication Data

US 2023/0140080 A1 May 4, 2023

Related U.S. Application Data

(63) Continuation of application No. 16/988,045, filed on Aug. 7, 2020, now abandoned.
(Continued)

(51) Int. Cl.
*H01R 25/00* (2006.01)
*H01R 13/72* (2006.01)
(Continued)

(52) U.S. Cl.
CPC ............ *H01R 13/74* (2013.01); *H01R 13/72* (2013.01); *H01R 24/68* (2013.01); *H01R 25/006* (2013.01)

(58) Field of Classification Search
CPC ........ H01R 13/74; H01R 13/72; H01R 24/68; H01R 25/006
See application file for complete search history.

(56) References Cited

U.S. PATENT DOCUMENTS 4,553,798 A 11/1985 Murphy
5,957,701 A 9/1999 McMillin
(Continued)

FOREIGN PATENT DOCUMENTS

GB 2571295 A 8/2019

OTHER PUBLICATIONS

International Search Report and Written Opinion mailed Apr. 6, 2021; International Patent Application No. PCT/US2021/012261 filed on Jan. 6, 2021.

*Primary Examiner* — Michael C Zarroli
(74) *Attorney, Agent, or Firm* — McDonald Hopkins LLC

(57) ABSTRACT

Provided is a wall power outlet extender that may relocate the wall power outlet to a different position without requiring electrical work or professional installation and without cluttering adjacent surfaces. The wall power outlet extender may be positionable along a surface of a wall adjacent to a wall power outlet and may allow a user to semi-permanently relocate the wall power outlet. The wall power outlet extender may be made fixed and stationary at a particular position and relatively unmovable unless acted on or repositioned by a user. The wall power outlet extender may be selectively rotatable and/or telescopic, and include a spinning or ambidextrous plug, to be adaptable to the specific location and to provide a myriad of different positions in which the new outlet may be placed. The wall power outlet extender may feature multiple outlets, USB ports, and surge protection, as well as Bluetooth and wireless capabilities.

18 Claims, 12 Drawing Sheets

Related U.S. Application Data

(60) Provisional application No. 62/957,903, filed on Jan. 7, 2020.

(51) Int. Cl.

| | |
|---|---|
| ***H01R 13/74*** | (2006.01) |
| ***H01R 24/68*** | (2011.01) |

(56) References Cited

U.S. PATENT DOCUMENTS

| | | | | |
|---|---|---|---|---|
| 6,004,138 | A | 12/1999 | Harbertson | |
| 7,220,128 | B1 * | 5/2007 | Hicks | H01R 25/00 439/502 |
| 2013/0052882 | A1 | 2/2013 | Brausen | |
| 2017/0273203 | A1 * | 9/2017 | Iaconis | H02G 3/18 |
| 2017/0346244 | A1 * | 11/2017 | Comis | H01R 13/72 |
| 2018/0158305 | A1 * | 6/2018 | Noland | G08B 21/0438 |
| 2020/0313378 | A1 * | 10/2020 | Fyock | H02G 11/00 |

* cited by examiner

WALL MOUNTING OUTLET EXTENDER

CROSS-REFERENCE TO RELATED APPLICATIONS

This application is a 35U.S.C. § 371 national stage application of PCT/US2021/012261 filed on Jan. 6, 2021, entitled "WALL MOUNTING OUTLET EXTENDER," which claims priority to U.S. Utility application Ser. No. 16/988,045 entitled "WALL MOUNTING OUTLET EXTENDER" filed on Aug. 7, 2020 and U.S. Provisional Patent Application No. 62/957,903 entitled "WALL MOUNTING OUTLET EXTENDER" filed on Jan. 7, 2020 each of which are hereby incorporated by reference in their entireties.

FIELD OF THE INVENTION

The present disclosure generally relates to power outlet extenders and, more specifically, to a rotatable and/or telescopic power outlet extender that may be used to relocate a wall power outlet to multiple other positions on the wall.

BACKGROUND

Wall power outlets are stationary and, as a result, may be located in inconvenient or inaccessible areas of a household, workplace, or business. For example, wall outlets may end up being positioned behind sofas, mattresses, furniture, shelving, storage items, and the like. Such inconvenient or inaccessible wall outlets may cause any number of problems including the inability to easily plug in or unplug cords and devices into the wall outlet. Additionally, in order to reach these wall outlets, the cord of a particular device, such as that for a smart device, television, computer, laptop, charger, lamp, and the like, may not be long enough to plug into the wall outlet and be used as desired.

As it stands, actually changing the location and accessibility of an otherwise stationary wall outlet requires an electrician and direct access into the wall. Such relocation of a wall outlet and access into the wall can be invasive, costly, and require a specialized workman or professional installation. Additionally, relocation of a wall outlet to another position on the wall by an electrician is permanent, and the new stationary wall outlet also cannot be further relocated or repositioned at a later time without going through the same process.

Other options for extending a wall outlet include extension cords. Extension cords typically comprise a flexible cord that plugs into the wall outlet on one end and runs along the floor or other flat surface to its other end that houses one or more outlets. Extension cords are often used temporarily, such as in situations for using power tools outside of the house, powering indoor and outdoor Christmas lights, and the like. When used in more permanent or daily situations, extension cords can clutter the floor or surface it lays on and cause other inconvenience, can be accidentally moved or damaged, and can put stress on the juncture between the wall outlet and the plug resulting in fraying or other damage.

What is needed is a wall power outlet extender that can be positioned or mounted on a wall and that can relocate the wall power outlet to a different position on the wall without requiring electrical work or professional installation and without cluttering adjacent surfaces. What is also needed is a wall power outlet extender that is repositionable, remountable, and removable to accommodate changing needs.

SUMMARY OF THE INVENTION

A wall outlet extender that extends a wall outlet to a new position on a wall may include a plug end configured to selectively plug into the wall outlet, an outlet end configured to selectively receive one or more plugs, and an extendable shaft between the plug end and the outlet end. The wall outlet extender may be rotatable about the plug end.

The wall outlet extender may also include any of the foregoing, which may be combined in any manner without departing from the present teachings. In an embodiment, the extendable shaft may include two more or telescoping portions. The extendable shaft may include a first telescoping portion having a first diameter and a second telescoping portion having a second diameter, wherein the first diameter may be larger than the second diameter. The first telescoping portion may be configured to internally receive the second telescoping portion in a retracted position. In an embodiment, the extendable shaft may be extendable from about 21 inches to about 34 inches. In an embodiment, the plug end may be rotatable about 360°. In an embodiment, the wall outlet extender may further include an engagement portion. The engagement portion may be positioned on a wall-facing side of the outlet end and may be configured to selectively engage the wall. The engagement portion may comprise a non-permanent adhesive, removable putty, or stickable surface. The engagement portion may be free from any attachment to the wall that traverses or damages the wall surface. In an embodiment, the outlet end may include an even number of outlets and at least one USB port. In an embodiment, the outlet end may include interchangeable faceplates. In an embodiment, the outlet end may include a device cradle configured to hold a device while the device is plugged into the outlet end. In an embodiment, the wall outlet extender may include Bluetooth or Wi-Fi connectivity capabilities.

An extendable power outlet adaptor may include a plug selectively configured to insert into a wall outlet, a shaft that is telescopic and that is rotatable about the plug up to 360°, and one or more outlet receptacles connected to the shaft that are selectively attachable to a position on a wall adjacent to the wall outlet.

The wall outlet extender may also include any of the foregoing, which may be combined in any manner without departing from the present teachings. In an embodiment, the outlet receptacles may be attachable to the wall by temporary adhesive, putty, or stickable surface. In an embodiment, the extendable power outlet adaptor may be free from any attachment to the wall that traverses or damages the wall surface. In an embodiment, the extendable power outlet adaptor may be removed and repositioned onto the wall.

BRIEF DESCRIPTION OF THE DRAWINGS

The present teachings may be better understood by reference to the following detailed description taken in connection with the following illustrations, wherein.

DETAILED DESCRIPTION

Figure 1A:
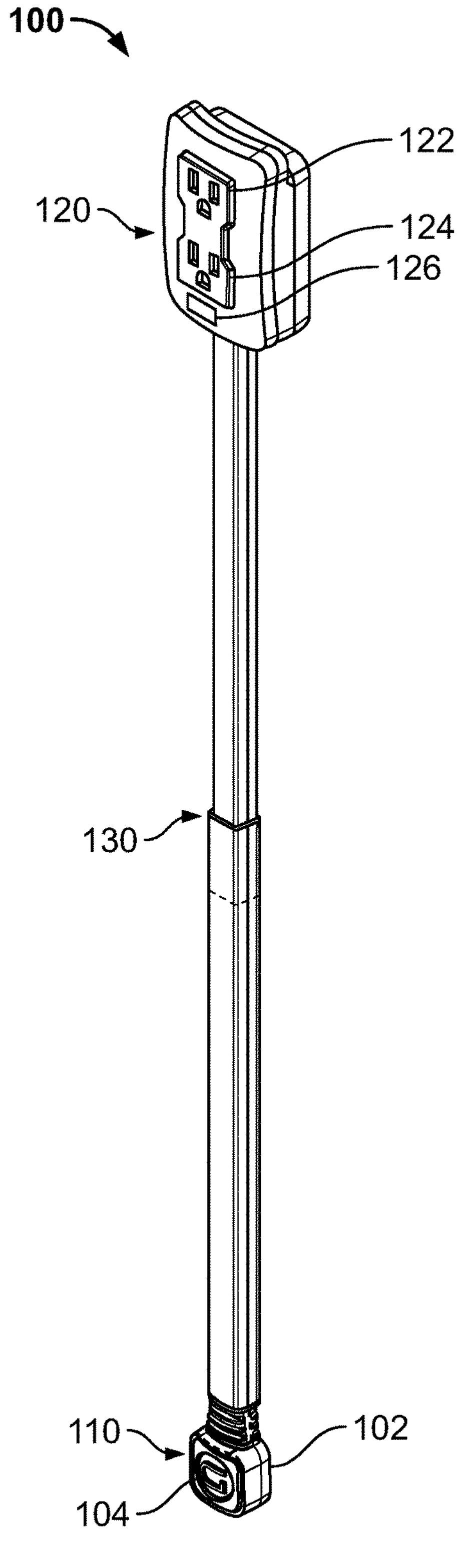
FIG. 1A depicts an isometric view of an embodiment of an outlet extender in an extended position in accordance with aspects of the present disclosure.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Provided is a wall power outlet extender that may be positioned or mounted on a wall and that may relocate the wall power outlet to a different position on the wall without requiring electrical work or professional installation and without cluttering adjacent surfaces. The wall power outlet extender may be positionable along a surface of a wall adjacent to a wall power outlet and may allow a user to semi-permanently relocate the wall power outlet. The wall power outlet extender can be permanent in that it may not be as accidentally movable as an extension cord, may be able to have a low profile on or against a wall, and may have a rigid housing. The wall power outlet extender can be temporary in that it does not require any professional installation, does not require opening of a wall or electrical work, and can easily be unplugged and re-plugged into the same or a different wall power outlet.

The wall power outlet extender may become fixed and stationary at a particular position and relatively unmovable unless acted on or repositioned by a user. The wall power outlet extender may be selectively rotatable and/or telescopic, and include a spinning or ambidextrous plug, to be adaptable to the specific location and to provide a myriad of different positions in which the new outlet may be placed. The wall power outlet extender may feature multiple outlets, USB ports, and surge protection, as well as Bluetooth and wireless capabilities, which are described in more detail below.

FIGS. 1-4 depict an outlet extender 100 having a plug end 110 and an outlet or socket end 120 electrically connected by an elongated extender or extendable shaft 130. The outlet extender 100 may comprise a housing (such as 222 described in more detail below) that is partially hollow to accommodate electrical line or lines (of appropriate configuration) positioned through the elongated extender 130 and between the plug end 110 and the outlet end 120. The plug end 110 may include one or more plugs or sets of male contacts 112 that are operatively attachable to an outlet, such as a wall outlet. The plugs or male contacts 112 may be placed on a back or wall-facing side 102 of the outlet extender 100, see FIG. 4A. The plugs or male contacts 112 may be of any orientation and fitted to connect with any type of outlet, including household outlets, appliance outlets, industrial or commercial outlets, and outlets in any country, such as the U.S., Europe, Asia, Australia, etc. In some embodiments, the plugs or male contacts 112 may be replaceable, i.e., a user may remove one of the plugs or male contacts 112 and replace it with a different one, such as one that has a different configuration. This will allow a user to utilize the outlet extender 100 with one type of plug and then replace the plug or male contact 112 with a different one, such as by way of an example, by replacing a U.S. plug with one of a European configuration. The outlet end 120 may include one or more outlets or female receptacles 122, 124 that operatively receive a plug. In the embodiment shown in FIG. 1, a pair of outlets or female receptacles 122, 124 may be utilized. It should be understood, however, that any number of female receptacles may be utilized, e.g., one, three, four, five, six, etc.

The outlets or female receptacles 122, 124 may be placed on an opposite side from the plugs or male contacts 112, or on a front or room-facing side 104 of the outlet extender 100. As a result, the plugs or male contacts 112 may be plugged into a wall outlet and the outlets or female receptacles 122, 124 may face the room to be accessible to receive other plugs, see FIG. 4A. The outlets or female receptacles 122, 124 may be of any orientation and fitted to connect with any type of plug, including plugs for household items, appliances (such as electrical dryers), industrial or commercial devices or machinery, electrically powered items, and plugs that are used in any country, such as the U.S., Europe, Asia, Australia, etc. Although the drawings generally depict a three-prong AC plug and outlets as used in the U.S., it is noted that any plug and outlets may be incorporated into the outlet extender design. In some embodiments, the plug and outlet may be of a similar configuration or they may be of a different configuration such that the outlet extender 100 can act as an adapter to change the outlet from a first configuration to a second configuration (e.g. a U.S. plug and European receptacles or vice versa). In an embodiment, the plug end 110 and the outlet end 120 may include mating plugs and outlets, or the plug end 110 and the outlet end 120 may include plug and outlet types that are different. The plug end 100 may comprise Type A, B, C, D, E, F, G, H, I, J, K, L, M, N and O IEC plug ends that are utilized throughout the world. Further the plug end 100 may comprise a 120 volt end, 240 volt end or a combination of the foregoing.

In an embodiment, the plug end 110 may include a single plug, may include a single plug and a decoy plug, two plugs, or any number of plugs. The present disclosure contemplates use of any number of plug ends 110 (e.g., one, two, three, etc.). In an embodiment having a decoy plug, the decoy plug may plug into the second outlet in the wall outlet and may provide additional structural support to the outlet extender 100 as it is positioned against the wall. The decoy plug may be made of a plastic or non-electrically conductive material. In an embodiment with two plugs, each plug may enter into one of the outlets on the wall outlet and may receive or transfer power or electricity. FIG. 3B shows an embodiment of the plug end having a single plug 112. In an embodiment having a single plug, the other plug in the wall outlet may remain accessible and accommodate another outlet extender or a plugged in device.

Figure 1B:
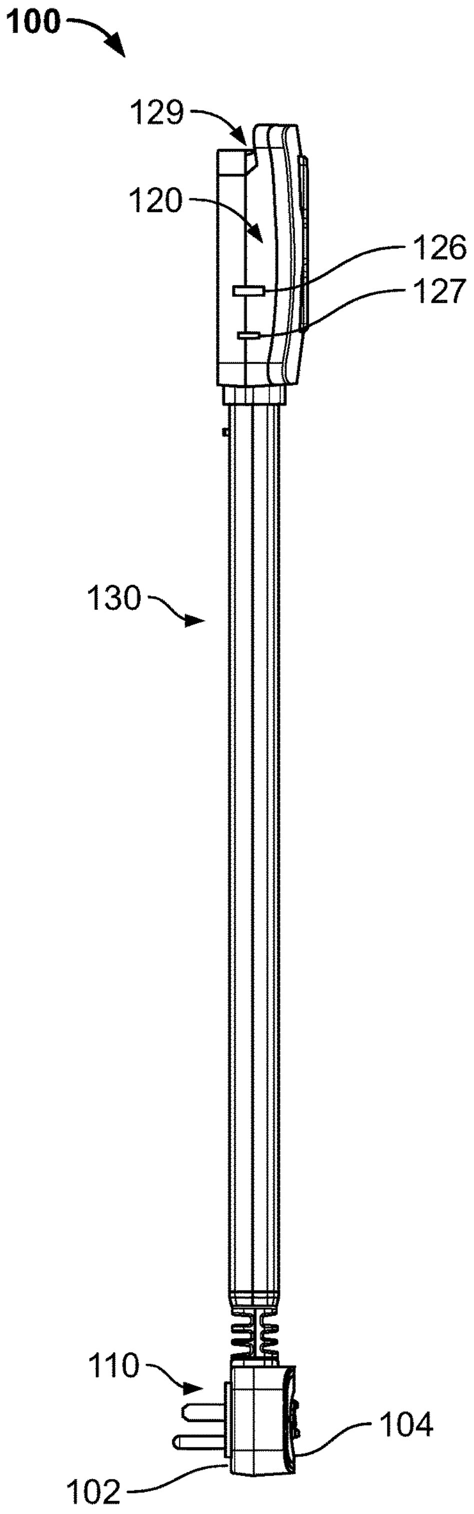
FIG. 1B depicts an isometric view of an embodiment of an outlet extender in an extended position in accordance with aspects of the present disclosure.
Figure 2A:
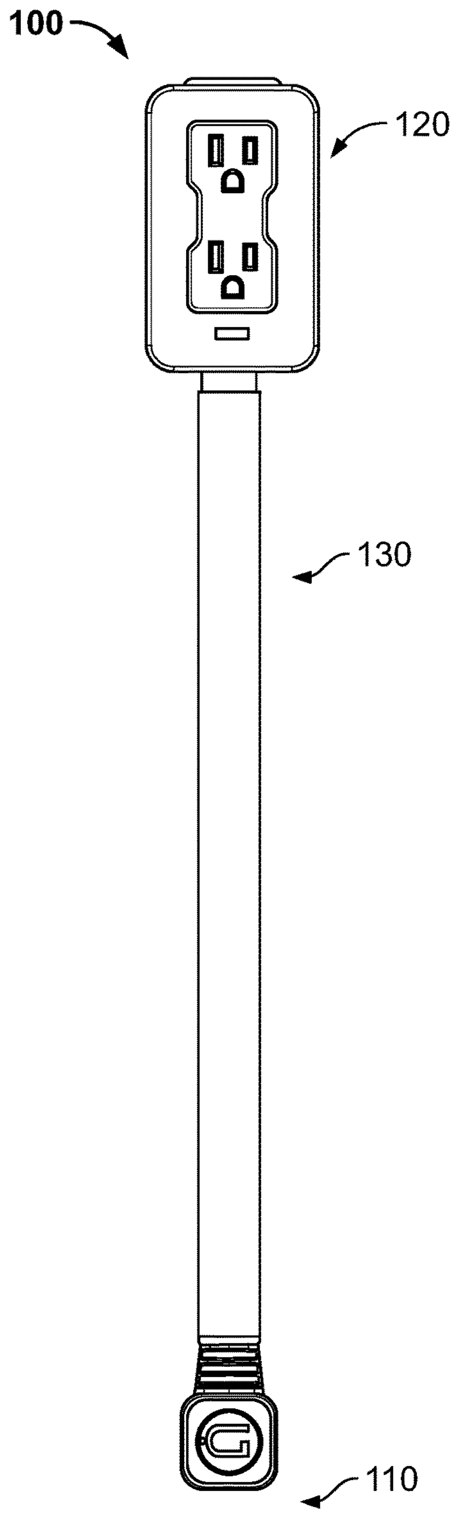
FIG. 2A depicts a front view of an embodiment of an outlet extender in a retracted position in accordance with aspects of the present disclosure.
Figure 2B:
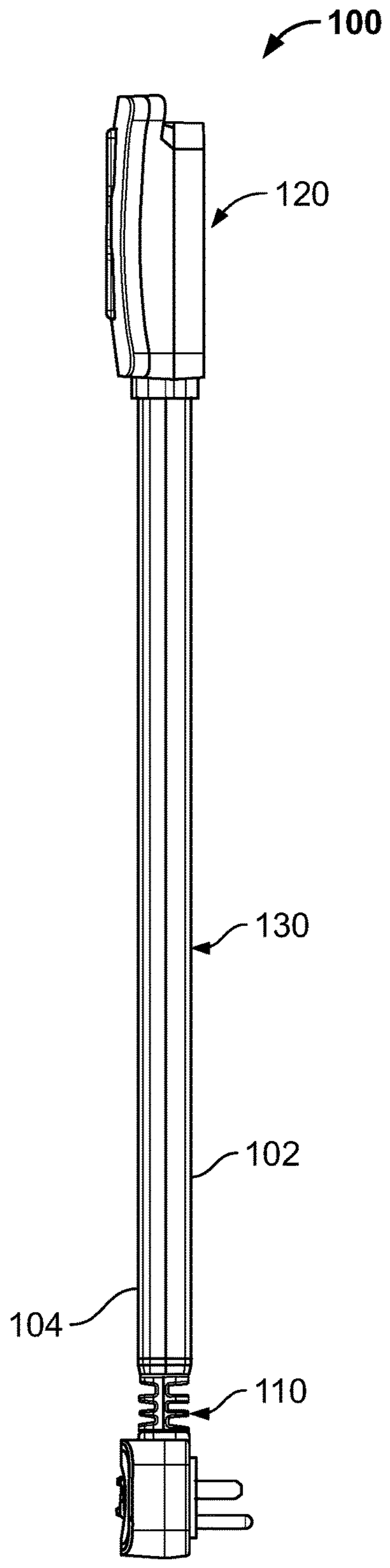
FIG. 2B depicts a side view of the outlet extender shown in FIG. 2A in a retracted position in accordance with aspects of the present disclosure.
Figure 2C:
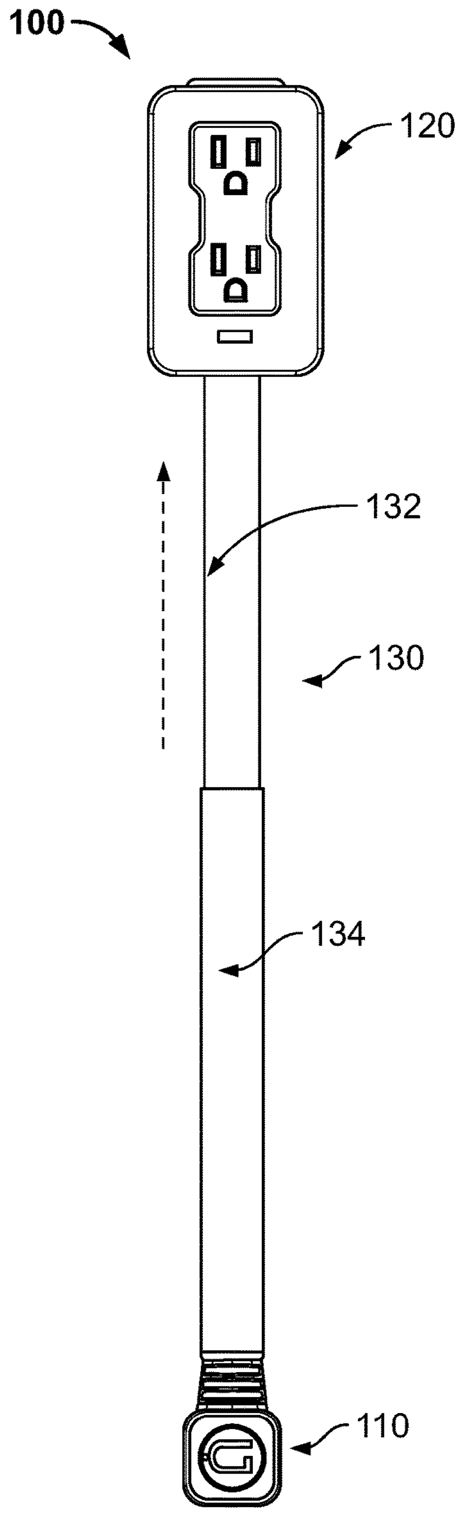
FIG. 2C depicts a front view of the outlet extender shown in FIG. 2A in an extended position in accordance with aspects of the present disclosure.

In an embodiment, the outlet end 120 may include one or more outlets or receptacles 122, 124. For example, the outlet end 120 may include one, two, three, four, five, six, seven, eight, nine, ten, eleven, twelve, or more outlets. The outlets 122 may be located on the face of the outlet end 120, as shown in FIGS. 1-4, but it is noted that the outlets 122 may be located on any side of the outlet end 120 as well, such as the side, top, or bottom edges. One or more of the outlets 122, 124 may include a GFCI (Ground Fault Circuit Interrupter). The outlets 122, 124 may also include surge protection that can protect against surges or spikes and limit the voltage supplied to a connected device by either blocking or shorting, to ground any voltages above a certain threshold. The outlets 122 may be able to accommodate any necessary voltage and power abilities so as to provide power to and charge cell phones, laptops, computers, tablets, appliances, and the like, and may be integrated with increased voltages, cables, and capabilities to provide faster or lightening charging and power. The outlet end 120 may also include one or more USB type outlets 126, such as one, two, three, four, five, six, seven, eight, nine, ten, eleven, twelve, or more USB type outlets. The USB type outlets 126 may be USB A (shown as 126) or USB C (shown as 127) outlets. The USB type outlets may be located on a face of the outlet end 120 with the plugs, as shown in FIGS. 1A, 2A, and 2C, or may be located on the side of the outlet end 120, and as shown in FIG. 1B. Although other outlet types may not be specifically mentioned, it is noted that any outlet or combination of outlets may be incorporated into the outlet end 120. Further, the outlet end 120 may comprise AFCI outlets, 20 A outlets, or any of Type A, B, C, D, E, F, G, H, I, J, K, L, M, N and O IEC outlets utilized throughout the world.

Figure 4B:
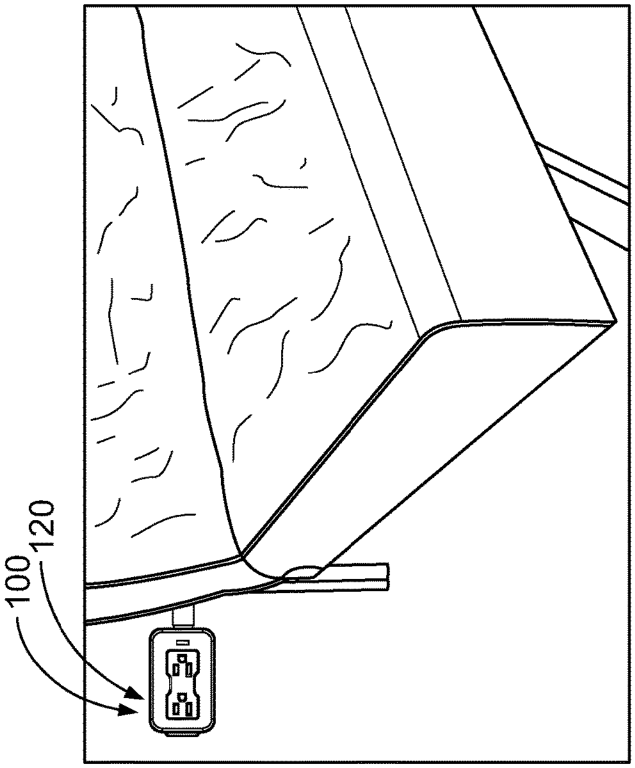
FIG. 4B depicts a front view of an embodiment of an outlet extender plugged into a wall outlet and rotated about 90° counter clockwise to a side position in accordance with aspects of the present disclosure.
Figure 4A:
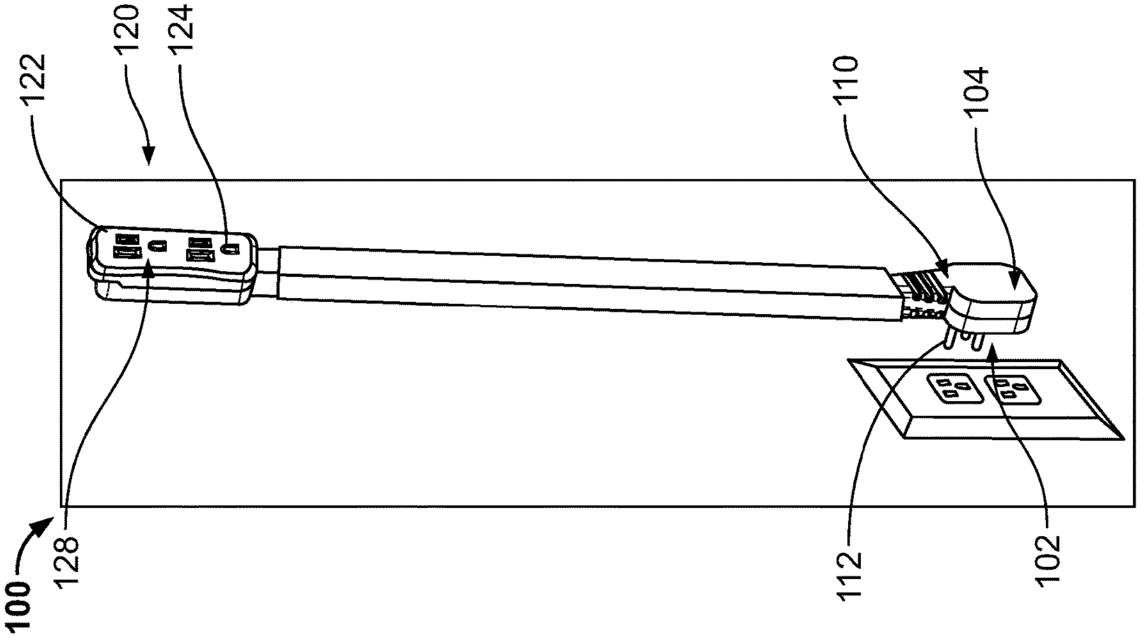
FIG. 4A depicts an isometric view of an embodiment of an outlet extender as it is being plugged into a wall outlet in accordance with aspects of the present disclosure.

The outlet end 120 may include a device cradle, shelf, or holder, such as, for example holder 129. The device cradle, shelf, or holder may be located on any side of the outlet end 120 and may serve as a location to put or hold a device, such as a phone, tablet, home device, security device, or the like. The cradle, shelf, or holder may hold the device while such device is plugged into one of the outlets 122, 124. The cradle, shelf, or holder 129 may also include wireless charging technology to charge a device when it is in physical contact with the cradle, shelf, or holder if the device is within a threshold vicinity or distance to facilitate charging. The cradle, shelf, or holder 129 may also serve as a location to put or hold any item, including pencils, pens, other writing utensils, notebooks, address books, keys, wallets, purses, hairdryers, hair straighteners, toothbrushes, toothpaste, other bathroom items or household items, etc. In an embodiment, an extended shelf or faceplate with an extended shelf may be operatively attached to the outlet end 120 where the extended shelf is capable of holding heavier, larger, or specific objects (e.g., with holders or hooks configured to receive a key ring or hair item, etc.). The extended shelf may provide any size shelf as may be desired. The outlet end 120 may also include interchangeable faceplates 128 such as for, as an example, decoration or to provide an extended shelf. FIG. 4A, for example, shows a faceplate 128 having a different color than the remaining outlet extender 100. The faceplate 128 may include any color or colors, any pattern, any symbols, and the like, as may be desired. The faceplate 128 may be removed and attached by a sliding mechanism, snapping mechanism, fastener (such as a screw) friction fit, pressure fit, etc. It is noted that the color, shape, number of outlets, and the like, may vary when manufactured.

The outlet end 120 (or other portion of the outlet extender 100) may include capabilities to connect to Wi-Fi, Bluetooth, and other technology. The outlet end 120 (or other portion of the outlet extender 100) may communicate with any connected Wi-Fi, Bluetooth, Zigbee, or similar device. The outlet end 120 (or other portion of the outlet extender 100) may receive and transmit information to and from a connected device (such as a computer, smart device, tablet or the like), and may carry out instructions. For example, the outlet end 120 may communicate information about outlet extender 100 regarding health, plugged in devices, power utilized, power surges, power outages, whether the plugged in device is powered on or off, hours of use, amount of electricity used over a defined period of time, and the like. The outlet end 120 (or other portion of the outlet extender 100) may also be able to selectively turn on and turn off a plugged in device or power supply to any of the outlets 122, 124, individually or together. Turning on and off a plugged in device or power supply to any of the outlets 122, 124 may be done in response to a command from a connected device (such as a computer, laptop, smart device, smart phone, tablet or the like), through a home device, by voice command, by physical switch on the outlet end 120, or in response to an event such as a power outage, a power surge, after a certain period of time, or as a result of a programmed routine. Further, the outlet extender 100 may include a sensor or a plurality of sensors that may be used to turn on and turn off the outlet extender 100. By way of a non-limiting example, the sensor may comprise a motion sensor such that it may sense motion and turn on or provide power to the outlet extender 100. Other types of sensors may be utilized, such as light sensors, sound sensors, and the like.

The outlet end 120 may also include one or more indicators, such as a light indicator. The light indicator may be an LED light. The indicators may indicate whether power is being (or not being) supplied through the outlets 122, 124, whether power is being received from the wall outlet, whether surge protection is enabled, whether the outlet extender 100 is connected to Wi-Fi or Bluetooth, Zigbee, and the like. The one or more light indicators may be different colors, may blink, and may create different patterns or combinations to convey its indications.

The outlet end 120 or plug end 110 may also include a light that is not an indicator, such as an LED light, that serves as a nightlight. The light may have a sensor to determine ambient light or darkness and may automatically turn on and off when a certain threshold is met (e.g. the light may automatically turn on at dusk and turn off at dawn, when a light in the room is turned on and off, and the like.) The light may further turn on and off by a user pressing a switch or by a command over Wi-Fi, over Bluetooth or Zigbee, by voice, through a home device, and the like. The light may be set to a certain timed schedule to turn on and off at a specific time each day. The light may also include a motion sensor and turn on or off when such motion is sensed, or after a certain set time when no motion is sensed.

The outlet end 120 or plug end 110 may further include a built-in speaker, for example, a Bluetooth speaker or other configuration of a speaker, or a speaker may be selectively attachable to the outlet end 120 or plug end (such as by a faceplate attachment). The speaker may be separately chargeable or may pull power from the wall outlet or outlet extender 100 in any appropriate manner. The speaker may be charged by the outlet extender 100 (or more specifically through the power provided to the outlet end 120). The outlet end 120 may include an attachment device of any appropriate configuration to which the speaker may be selectively attached in any appropriate manner.

In an embodiment, the outlet extender 100 may be fixed, rigid, or stationary along the entirety of its length (e.g. not rotatable or not telescopic). For example, the fixed, rigid, or stationary outlet extender 100 may be provided in different sizes, e.g. 12 inches, 24 inches, 36 inches and any length lesser, greater, or in between. The outlet extender 100 may also include additional fixed adaptors that may be attached to the elongated shaft to adjust the length of the outlet extender 100 while still remaining fixed, rigid, or stationary overall. The fixed, rigid, or stationary outlet extender 100 may also include different oriented plugs or male contact 112 and plugs or female receptacles 122, 124, to facilitate plugging into a wall outlet in a straight orientation, a left side orientation, right side orientation, and similar.

In an embodiment, the outlet extender 100, or a portion thereof, may be selectively rotatable at a point along its length. The outlet extender 100 may be selectively rotatable any range of degrees, such as, for example from about 5° to about 360°. The outlet extender 100 may be selectively rotatable about 180° so that the outlet end 120 may be positioned straight above the wall outlet in a straight configuration when plugged in (see FIG. 4A), or straight to the left or right of the wall outlet in a horizontal configuration when plugged in (see FIG. 4B), or any variation therebetween, e.g., 45 degrees, 90 degrees, 135 degrees, 225 degrees, 270 degrees, 315 degrees or anything therebetween. The appropriate angle to be utilized may depend on the specific use of the outlet extender 100.

Figure 3A:
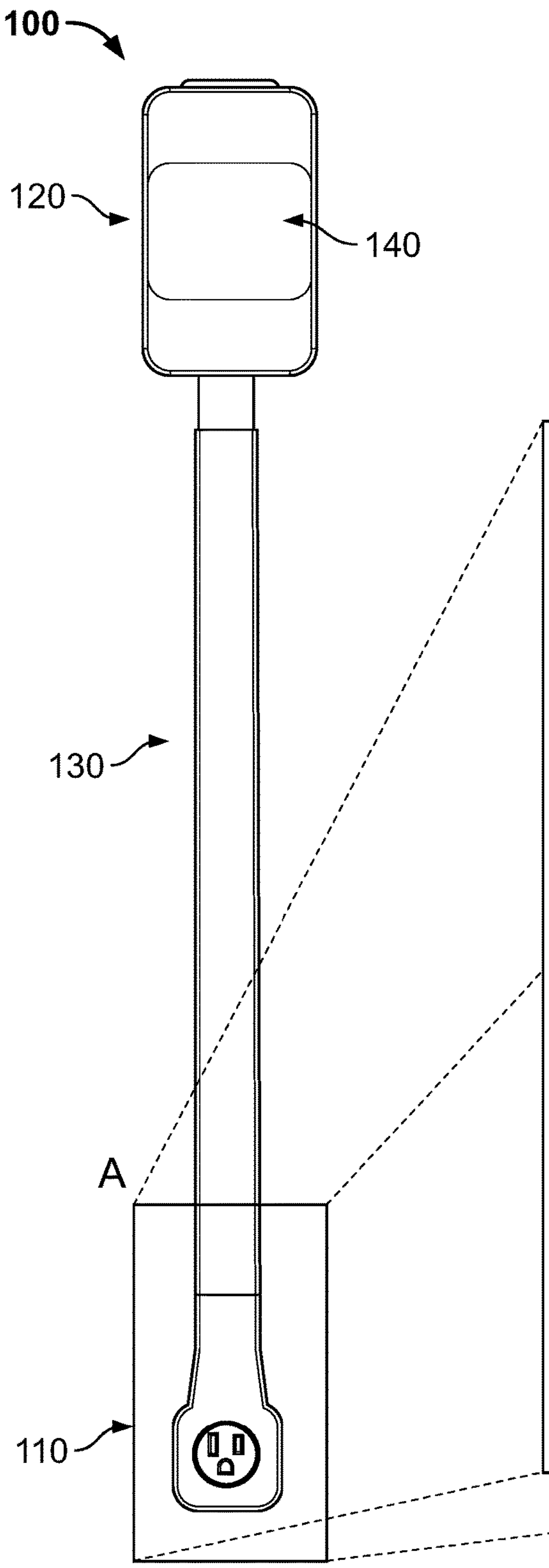
FIG. 3A depicts a back view of an outlet extender in a retracted position in accordance with aspects of the present disclosure.
Figure 3B:
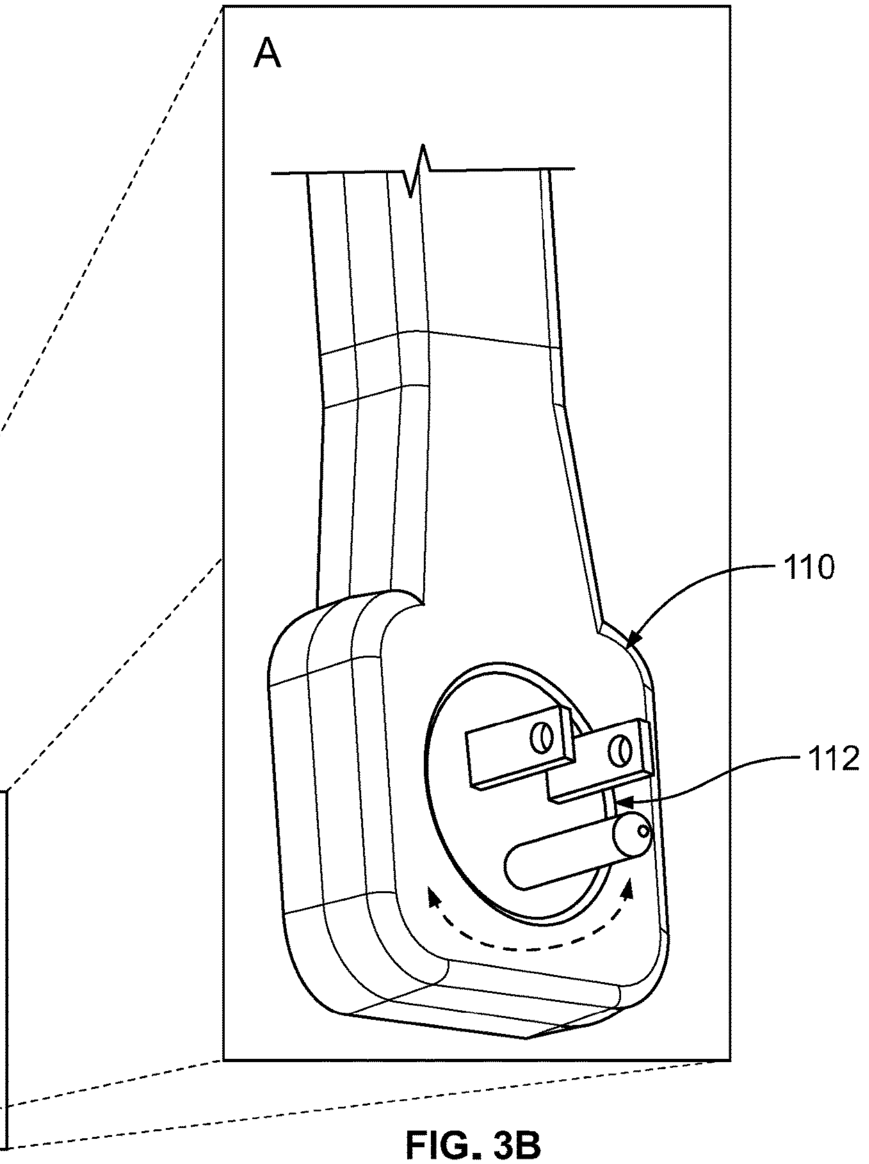
FIG. 3B depicts an expanded view of Box A of the outlet extender shown in FIG. 3A in accordance with aspects of the present disclosure.

As shown in FIG. 3B, the plug end 110 may be selectively rotatable in any appropriate manner. In an embodiment, a portion of the plug end 110 may be rotatable, such as the male contacts and associated base, or a swivel component. As seen in FIG. 4A-B, the outlet extender 100 may be plugged into a wall outlet initially in a straight configuration. Once the outlet extender 100 is plugged in at the plug end 110, the outlet end 120 may be rotated to the left about the point defined by the plug end 110 and its attachment to the wall outlet. This rotation may allow the outlet end 120 to clear the side of the couch or other furniture when in a horizontal position so that the outlets are accessible. Although the plug end 110 may be described as selectively rotatable, it is noted that any portion of the outlet extender 100 may be selectively rotatable, including, but not limited to, the extendable shaft 130. A user may selectively rotate the outlet extender 100 prior to plugging in the outlet extender 100 into the wall or when the outlet extender 100 has already been plugged into a wall outlet. The outlet extender 100 or plug end 110 may include a locking mechanism so that once the outlet extender 100 has been positioned in the desired location and at a desired angle, any undesired rotation of the outlet extender 100 may be prevented. The locking mechanism may include a bolt and slot, rotatable bar, spring-loaded hinge, and the like. The rotation of the outlet extender 100 or plug end 110 may be biased towards a certain position, such as a straight state.

In an embodiment, the outlet extender 100 may include an electrical cord portion between the elongated extender 130 and the plug end 110 that plugs into the wall outlet. The outlet extender 100 may plug into a wall outlet at the plug end 100, and then may be able to bend around a corner, be positioned on the floor, and the like, by the bendable cord portion. For example, the outlet extender 100 may be able to plug behind a desk, set on the floor or set on top of the desk, and have the outlets on the outlet end 120 available wherever the user desires. It is noted that while embodiments herein describe initial connection into a wall outlet, that any outlet may be used, such as an outlet in a power strip or surge protector.

Figure 2D:
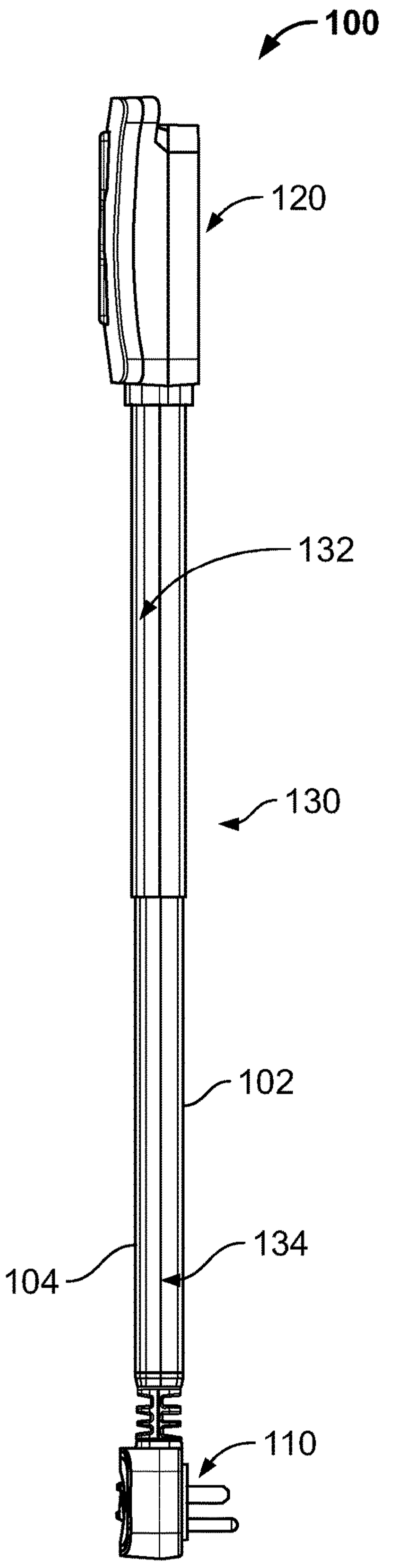
FIG. 2D depicts a side view of the outlet extender shown in FIG. 2A in an extended position in accordance with aspects of the present disclosure.

In an embodiment, the outlet extender 100 may be selectively extendable. In an embodiment, the elongated extender 130 may be selectively extendable permitting the outlet extender 100 to be extendable. As shown in FIGS. 2A-D, the elongated extender 130 may be transitioned between a retracted state (FIG. 2A, 2B) to an extended state (FIG. 2C, 2D). The extension may be facilitated by telescoping sections or members, wherein one or more sections of the elongated extender 130 may be of a smaller diameter than the immediately adjacent section (located at one of the section's ends) such that the smaller diameter section (see, e.g. 132) may nest into the larger diameter section (see, e.g. 134). The larger diameter section 134 may similarly nest into an even larger diameter section and the small diameter section 132 may similarly be able to nest within it an even smaller diameter section. The elongated extender 130 may include two or more telescoping sections including three, four, five, six, seven, eight, etc. sections. The sections may be at least partially hollow so as to accommodate smaller diameter telescoping sections in a collapsed state, as well as electrical lines running through the elongated extender 130 and between the plug end 110 and the outlet end 120.

Although sections of the elongated extender 130 include reference to diameter, it is noted that a cross-section of the elongated extender 130 may be round, square, or triangular and that nesting of any telescoping sections could be achieved by adapting the perimeter or diameter as described. FIGS. 1-4 generally show an elongated extender 130 having a square or rectangular cross-section. Further, one of the small diameter section 132 or large diameter section 134 or both thereof may be rigid or fixed. This may result in the elongated extender 130 being rigid or fixed. In other embodiments, one of the small diameter section 132 or large diameter section 134 or both thereof may be flexible such that the elongated extender 130 or a portion thereof may be flexible such that it may be positionable around objects, such as furniture, walls, shelves, or the like. The flexible portion may allow the elongated extender 130 to be positioned at any applicable angle, e.g., between 5 degrees and 360 degrees, or between 5 degrees and 180 degrees.

The extension of the elongated extender 130 between a retracted state (FIG. 2A, 2B) to an extended state (FIG. 2C, 2D) may be facilitated by other extension mechanisms such as an accordion housing, modular adaptors that may be attached to an end of the elongated extender 130, and the like. In an embodiment, the elongated extender 130 may allow extension for any range of length, such as, for example from about 1 inch to about 18 inches to even greater, and any length therebetween. In an embodiment, the elongated extender 130 may end from a length of about 21 inches to about 34 inches. The elongated extender 130 may include a locking mechanism so that once the outlet extender 100 has been transitioned to its desired length, any undesired extension or retraction of the elongated extender 130 may be prevented. The locking mechanism may include a bolt and slot, rotatable bar, spring-loaded hinge, and the like. The elongated extender 130 may be biased towards a certain position, such as a retracted state.

In an embodiment, the plug end 110 of the outlet extender 100 may plug into a wall outlet, and the outlet end 120 may be free to rotate and extend as desired by the user. The outlet extender 100, aside from the operative attachment of the plug end 110 into a wall outlet, may otherwise remain free and unattached to the abutting wall. The outlet extender 100 itself may have sufficient weight distribution and sturdy materials to allow for these variable configurations (e.g. a decoy plug, rigid housing, straight configuration, etc.).

In an embodiment, the outlet end 120 may include an attachment backing 140 on the back or wall-facing side 102 of the outlet extender 100, see FIG. 3A. When the plug end 110 of the outlet extender 100 is plugged into a wall outlet, the attachment backing 140 may comprise a way to selectively attach the outlet end 120 to the abutting wall. This attachment may provide additional stability to the outlet extender 100. This additional stability may be desired, for example, when the outlet extender 100 is in a horizontal configuration or extended fully. The attachment backing 140 may include a peel and stick adhesive pad for attachment to the wall, putty and dry-down putty attachment, hook and loop attachment, magnetic attachment, and the like. For example, a double sided adhesive pad may be attached to the wall-facing side 102 of the outlet end 120 and may be selectively attached to the wall, or two oppositely attracting magnets with peel back adhesive or putty attachments may be attached to the wall-facing side 102 of the outlet end 120 and the wall and be placed in magnetic contact. In using an adhesive pad, such pad may include adhesive that is non-marking, i.e., when it is removed from the surface or surfaces to which it is attached it does not leave any marks. Any appropriate non-marking adhesive may be utilized and the present disclosure is not limited to a specific type. Multiple magnets may be placed on the wall to allow for various and moveable attachment to the wall.

The attachment backing 140 may be selectively attached, detached, and reattached to allow for repositioning of the outlet extender 100 and without causing damage to the underlying wall. Although described embodiments include the attachment backing 140 on the wall-facing side 102 of the outlet end 120, it is noted that such attachment backing 140 may be located on any portion of the outlet extender 100, including the perimeter of the plug end 110 or the elongated extender 130. In an embodiment, the outlet extender 100 may be free from any attachment that fastens or anchors into, or otherwise traverses, the surface of the abutting wall (such as nails, screws, and the like). Such attachment may include the attachment backing 140 described herein (peel and stick adhesive pad for attachment to the wall, putty and dry-down putty attachment, hook and loop attachment, magnetic attachment, and the like), which may not fasten or anchor into, or otherwise traverse, the surface of the abutting wall. The attachment backing 140 being attached to (whether fixedly or removably) may permit a portion, e.g., the elongated extender 130 or a portion thereof, to be non-rigid or flexible. The attachment backing 140 being attached to a wall means that the elongated extender 130 does not need to be rigid as in other prior embodiments as the attachment backing 140 may provide additional structural support. In such embodiments, the elongated extender 130 does not need to provide support to the outlet end 120 to be positioned in the applicable location. Instead, the attachment backing 140 being attached to the wall allows the outlet end 120 to be positioned in its desired location.

In an embodiment, the outlet end 120 may include a fastening mechanism that does fasten or anchor into, or otherwise traverses, the surface of the abutting wall. Such fastening mechanisms can include nails, screws, pin and the like.

The exterior or housing of the outlet extender 100 may be formed from any suitable material including, but not limited to, plastics and polymers. Suitable materials may include polyethylene terephthalate (PETE or PET), high-density polyethylene (HDPE), polyvinyl chloride (PVC), low-density polyethylene (LDPE), polypropylene (PP), polystyrene or styrofoam (PS), other plastics such as polycarbonate, polylactide, acrylic, acrylonitrile butadiene, styrene, fiberglass, and nylon, or a combination of one or more thereof.

Figure 7:
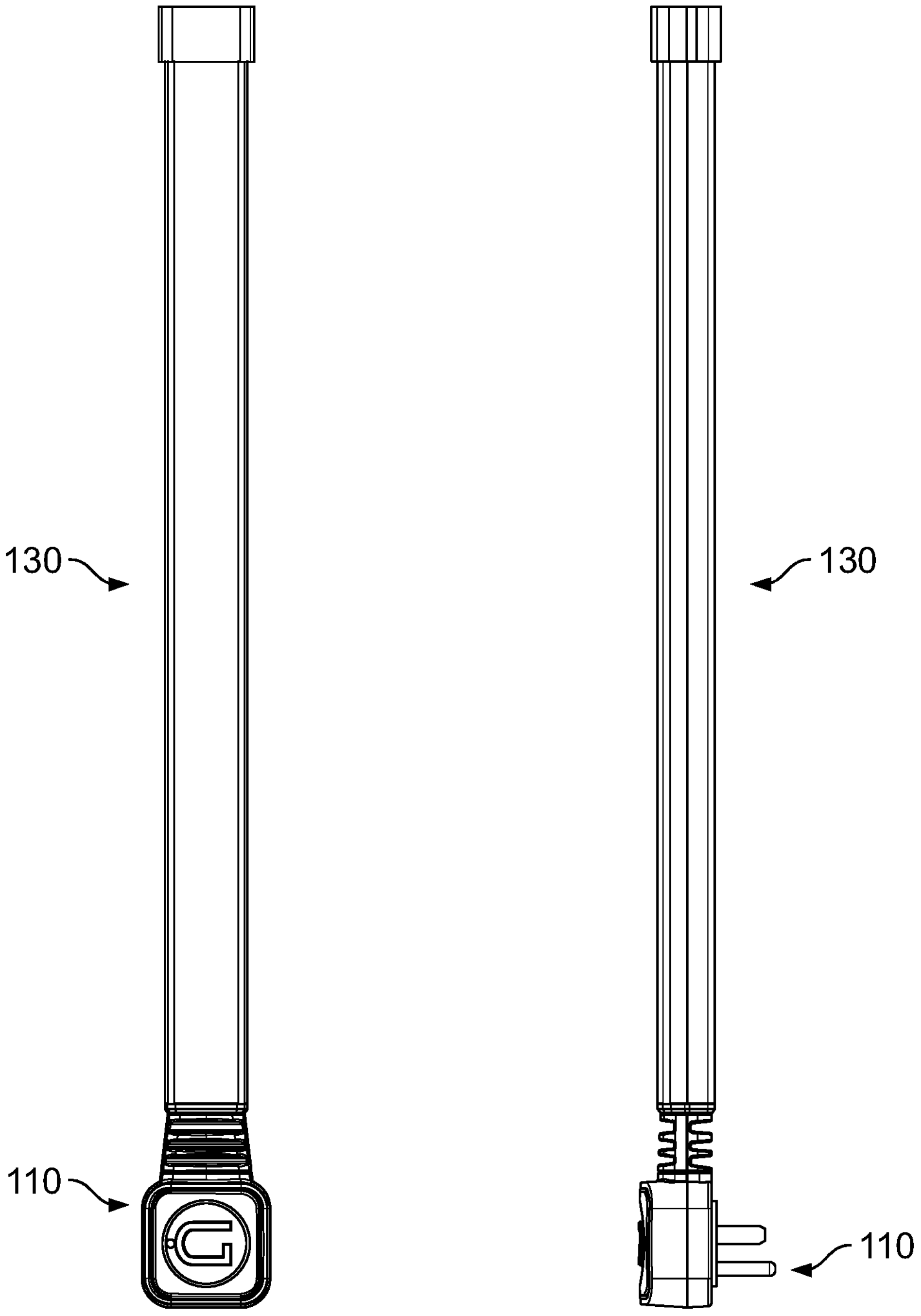
FIG. 7 depicts front and side views of an embodiment of a plug end and extendable shaft of an outlet extender in accordance with aspects of the present disclosure.
Figure 8:
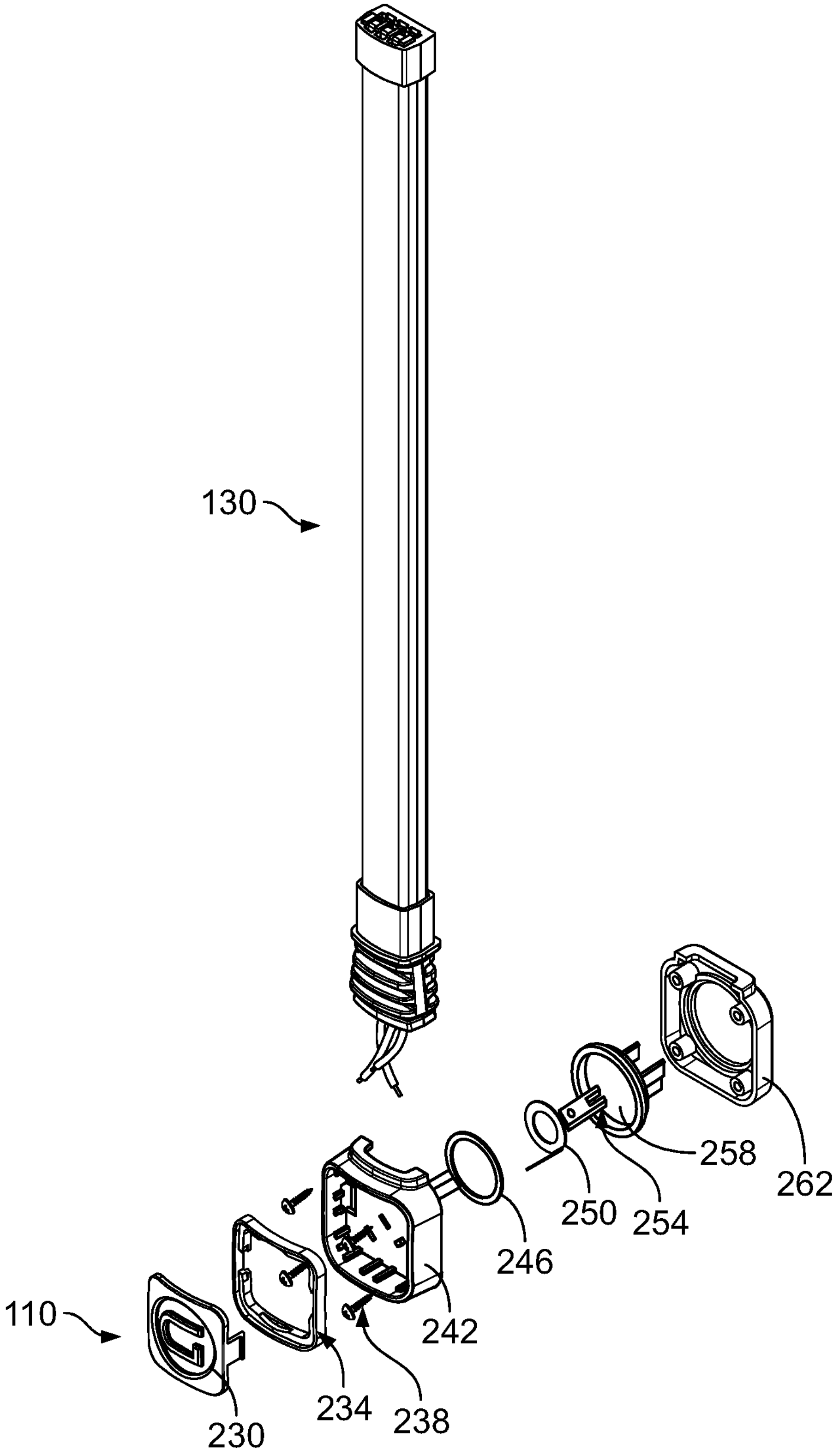
FIG. 8 depicts an exploded view of an embodiment of a plug end of an outlet extender in accordance with aspects of the present disclosure.

Turning to FIGS. 5-11 showing non-limiting detailed embodiments of the housing and components of an outlet extender, FIGS. 5-11 show exploded views and components of an outlet end 120 (such as FIGS. 5-6), extendable shaft 130 (such as FIGS. 9 and 10), and plug end 110 (such as FIGS. 8 and 11).

Figure 5:
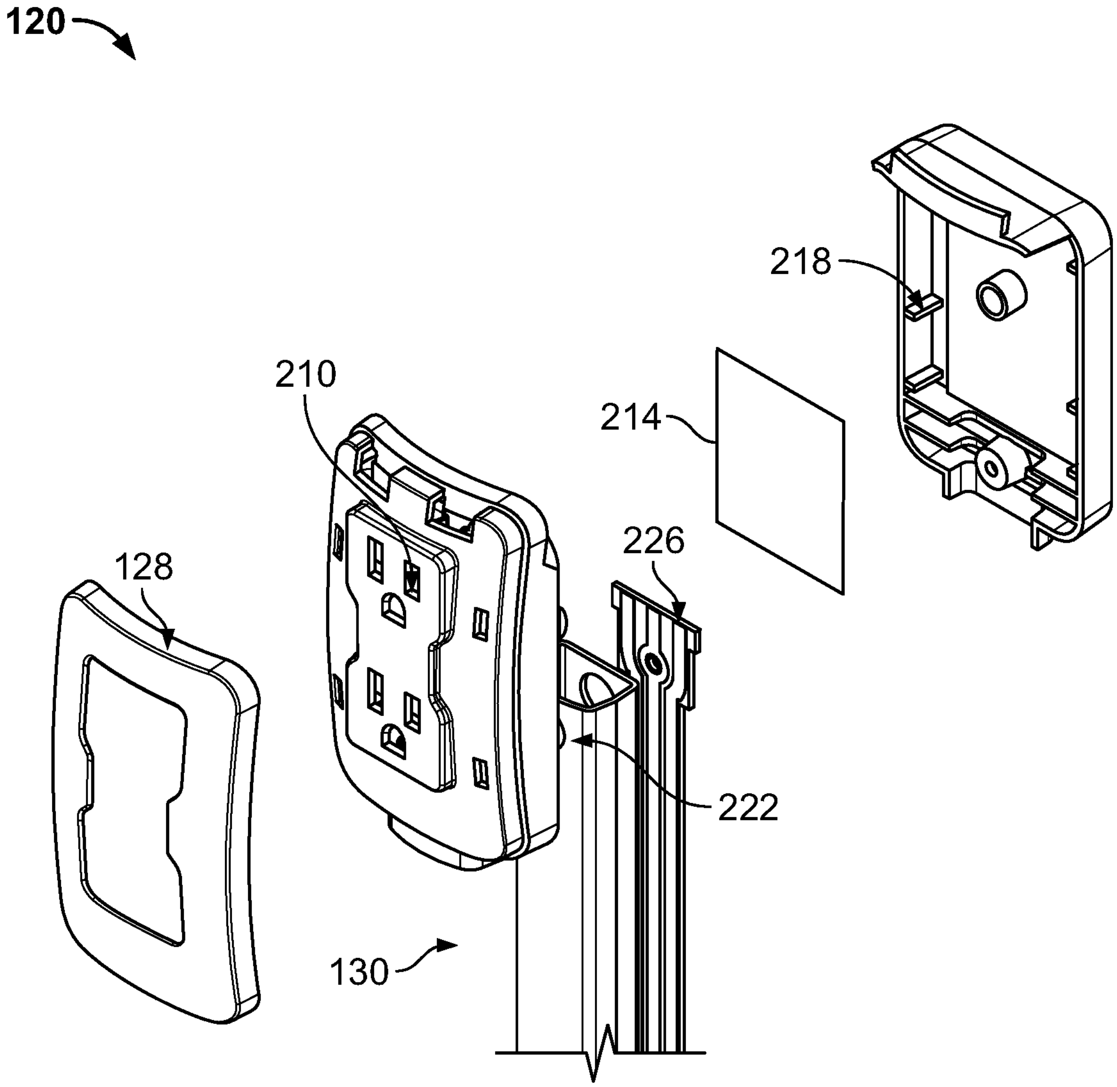
FIG. 5 depicts an exploded view of an embodiment of an outlet end and extendable shaft of an outlet extender in accordance with aspects of the present disclosure.
Figure 6A:
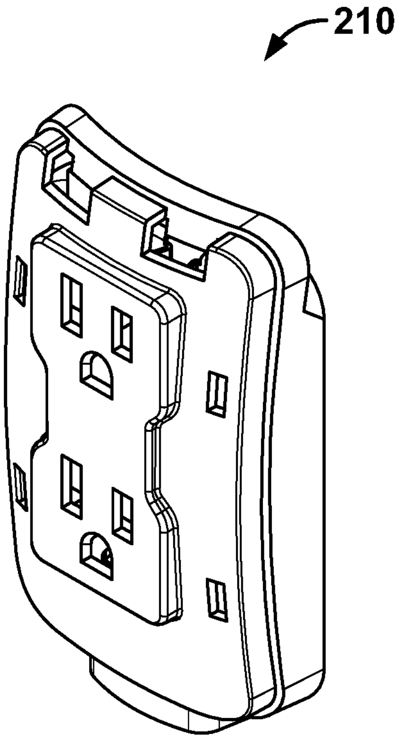
FIG. 6A depicts an isometric view of an embodiment of a front outlet housing, where
Figure 6C:
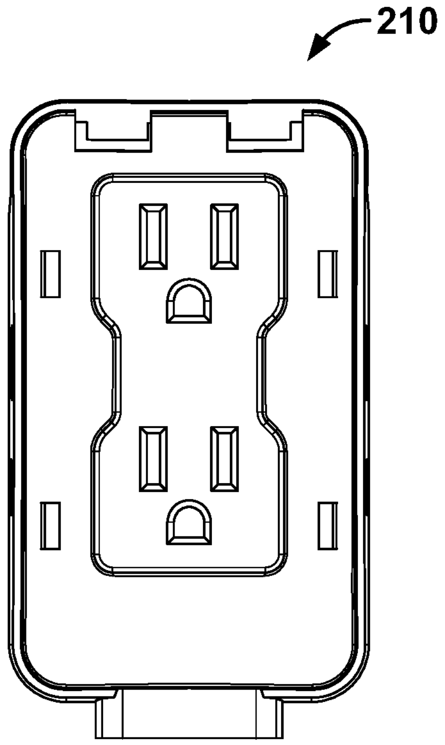
FIG. 6C shows a front view.
Figure 6B:
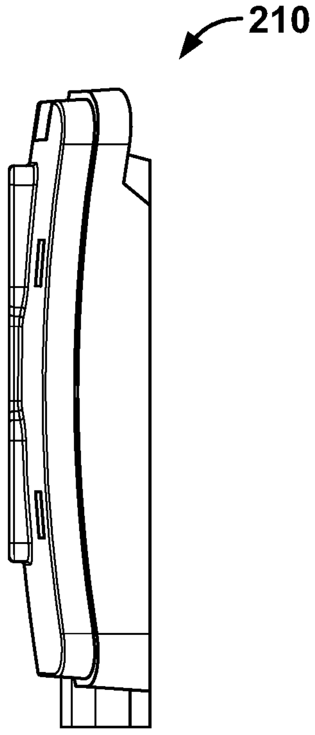
FIG. 6B shows a side view.
Figure 6D:
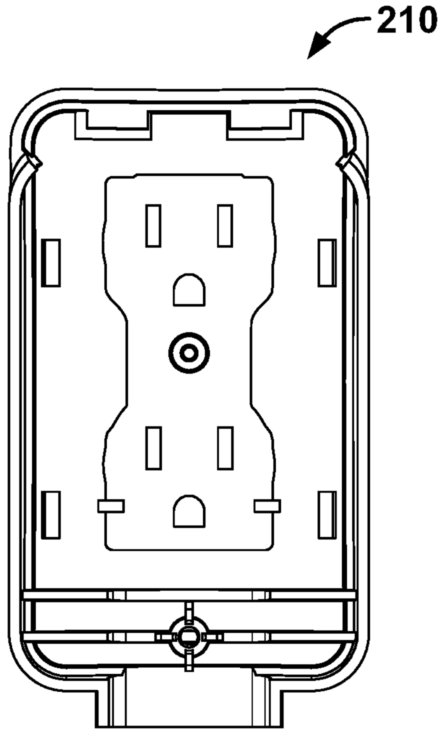
FIG. 6D shows a back view of the front outlet housing in accordance with aspects of the present disclosure.

FIG. 5 depicts an exploded view of a non-limiting embodiment of an outlet end 120 and extendable shaft 130 of an outlet extender 100. In an embodiment, the outlet end 120 may include an outlet faceplate 128, a front outlet housing 210, a tamper preventer 214, and a rear outlet housing 218. The tamper preventer 214 may, as an example, ensure that only a corresponding plug (e.g. with two or three metal prongs) and not a foreign item, is able to plug into the outlet end 120 and make an electrical circuit or connection with the outlet extender 100. The tamper preventer 214 may include a shutter/spring type mechanism so that full entry into the female receptacles of the outlet end 120 (opening of the shutters) is made possible only when each of the one or more springs are compressed at the same time (by insertion of a corresponding plug into each opening of the female receptacle at the same time). The extendable shaft 130 may include a first tube housing 222 and a contact plate 226. In an embodiment, the first tube housing 222 may be part of an outer telescoping tube (i.e. a larger diameter tube that another tube with a smaller diameter nests within) or an inner telescoping tube (i.e. a smaller diameter tube that nests into a tube with a larger diameter). FIGS. 6A-D show a non-limiting embodiment of the front outlet housing 210, including female receptacles.

Figure 9:
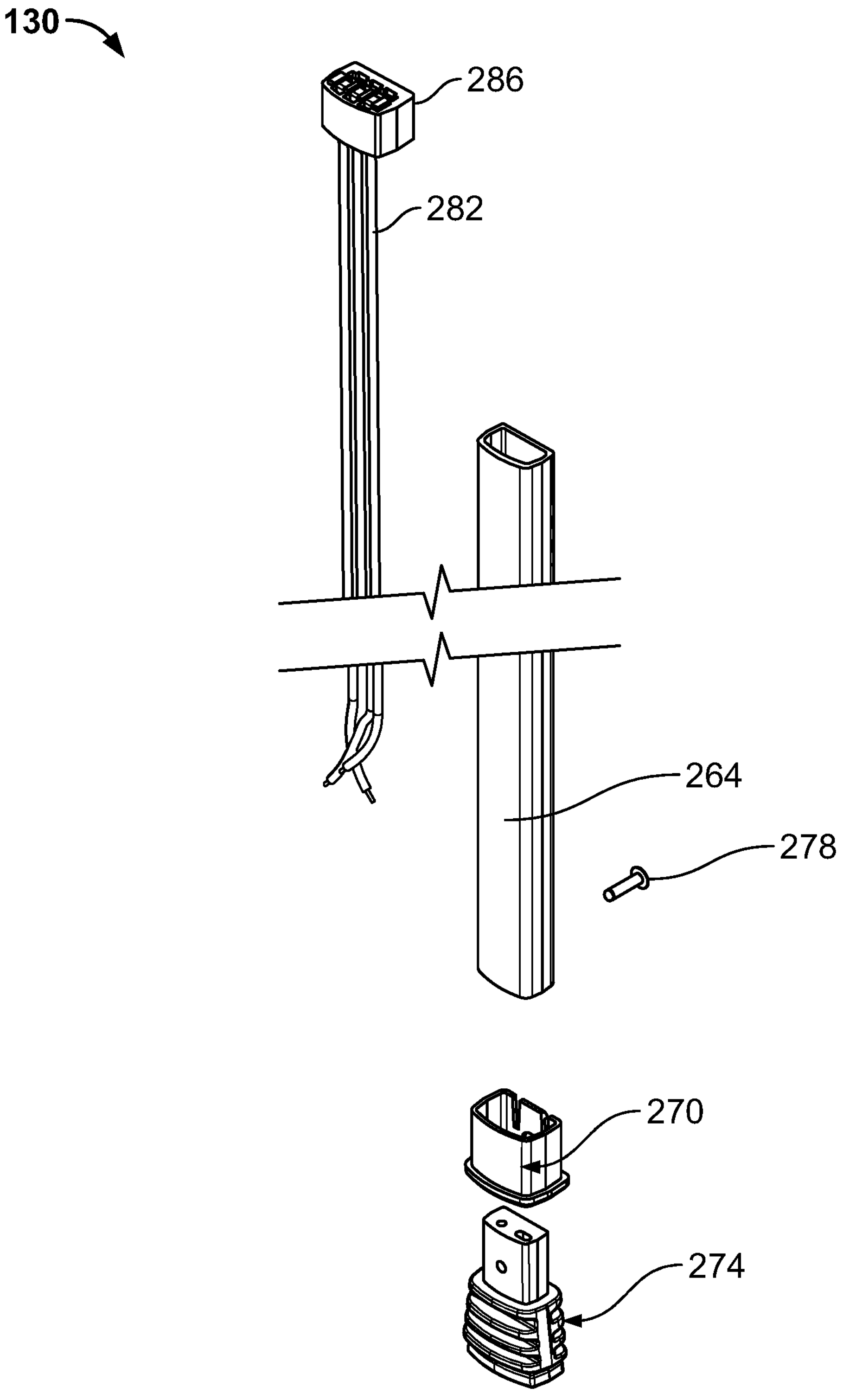
FIG. 9 depicts an exploded view of an embodiment of an extendable shaft of an outlet extender in accordance with aspects of the present disclosure.
Figure 10A:
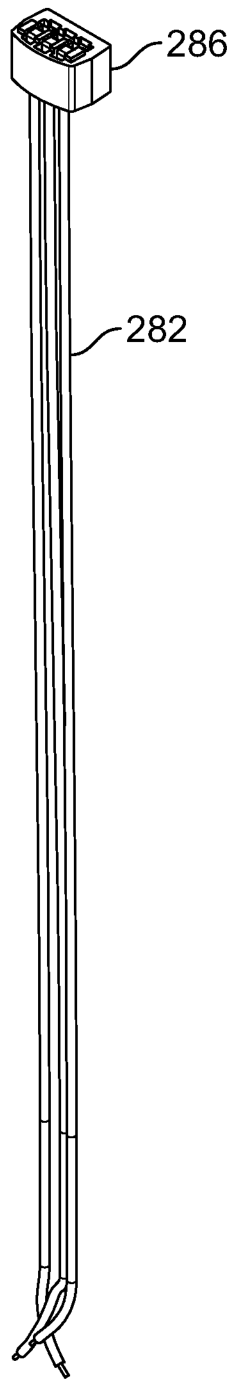
FIG. 10A depicts an isometric view of an embodiment of a cord assembly and FIG. 10B shows an exploded view of a cord assembly in accordance with aspects of the present disclosure.
Figure 10B:
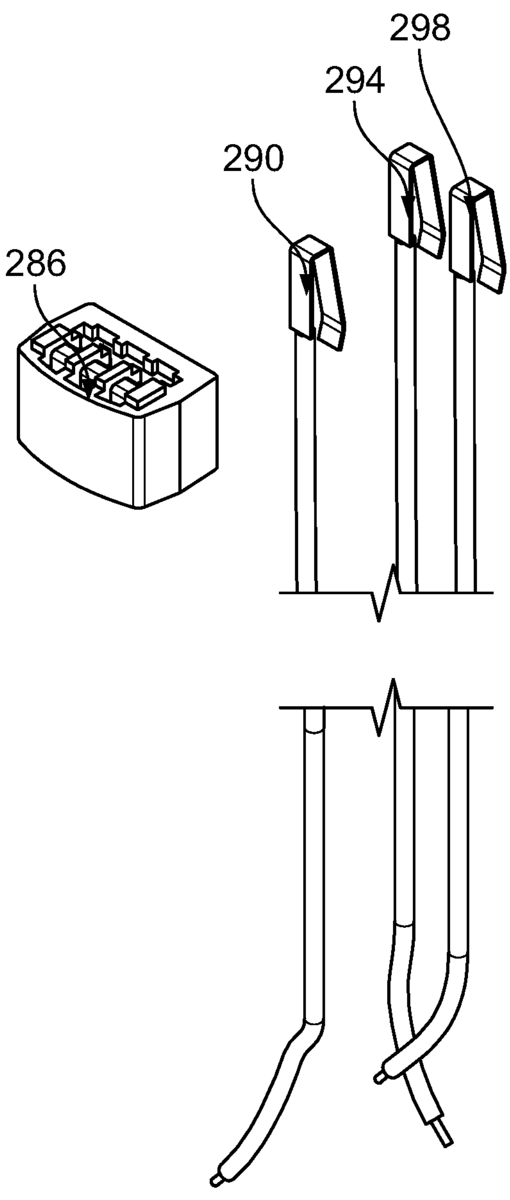
Figure 11A:
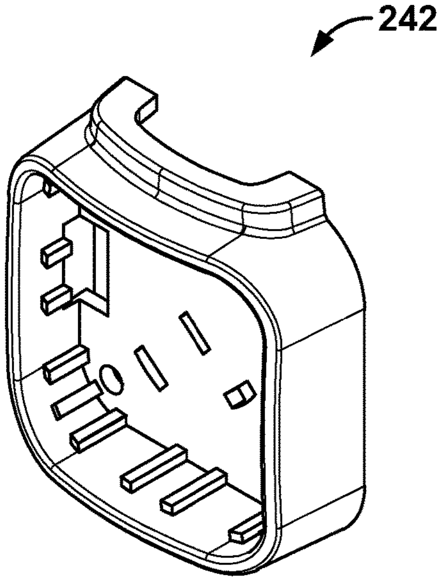
FIG. 11A depicts an isometric view of an embodiment of a front plug housing, where
Figure 11B:
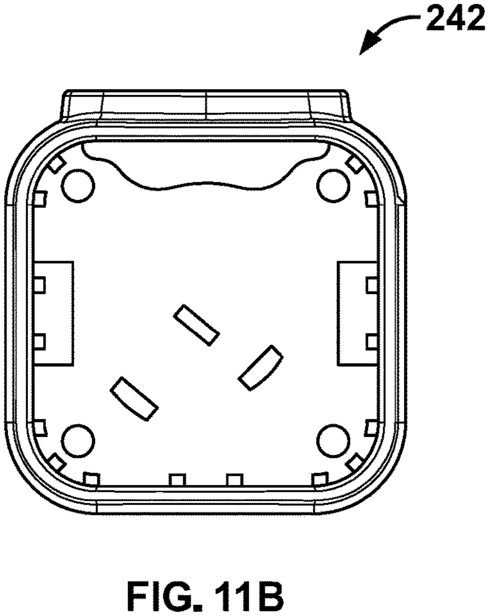
FIG. 11B shows a front view and FIG. 11C shows a back view of the front plug housing in accordance with aspects of the present disclosure.
Figure 11C:
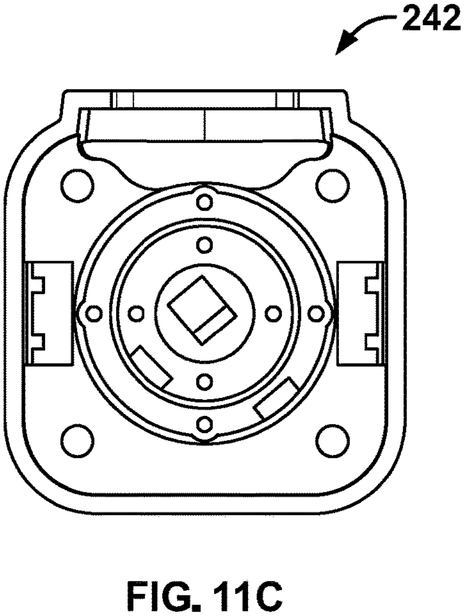

FIG. 7 shows an embodiment of a plug end 110 and extendable shaft 130 of an outlet extender 100 where FIG. 8 depicts an exploded view of an embodiment of the plug end 110 of the outlet extender 100 and FIG. 9 depicts an exploded view of an embodiment of the extendable shaft 130 of the outlet extender 100. In an embodiment and as shown in FIG. 8, the plug end 110 may include a plug faceplate 230, an inset band 234, fasteners 238 or another type of fitting mechanism as described herein, a front plug housing 242, an outer ring 246 and inner ring 250, a swivel seat 254, a plug 258, and a rear plug housing 262. The swivel seat 254 may facilitate rotation of the outlet extender 100 about an axis defined by the plug 258 as described herein. FIGS. 11A-C show a non-limiting embodiment of the front plug housing 242.

In embodiment and as shown in FIG. 9, the extendable shaft 130 may include a second tube housing 264, a first cap 270, a bend collar 274, fasteners 278 or another type of fitting mechanism as described herein, and a cord assembly 282 and second cap 286. In an embodiment, the second tube housing 264 may be part of an inner telescoping tube (i.e. a smaller diameter tube that nests into a tube with a larger diameter) or an outer telescoping tube (i.e. a larger diameter tube that another tube with a smaller diameter nests within). As an example, if the first tube housing 222 is an outer telescoping tube of a larger diameter, then the second tube housing 264 will be an inner telescoping tube of a smaller diameter, or vice versa, e.g., if the first tube housing 222 is an inner telescoping tube of a smaller diameter, then the second tube housing 264 will be an outer telescoping tube of a larger diameter. In an embodiment, the first cap 270 may selectively attach to the first tube housing 222 and the second cap 286 may selectively attach to the second tube housing 264. The bend collar 274 may enable flexibility in the extendable shaft 130 and outlet extender 100, such as during transition between different rotational and telescopic positions. The cord assembly 282, shown in FIGS. 10A-B, may further comprise ground 290, neutral 294, and hot 298 cords and assemblies.

Although the embodiments of the present teachings have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A wall outlet extender comprising:

a plug end configured to selectively plug into a wall outlet;

an outlet end configured to selectively receive one or more plugs;

an extendable shaft positioned between the plug end and the outlet end, wherein the plug end is rotatable;

an electrical cord portion positioned between the extendable shaft and the plug end, wherein the extendable shaft comprises a bend collar configured to enable flexibility in the extendable shaft adjacent to the plug end; and an engagement portion, wherein the engagement portion is positioned on a wall-facing side of the outlet end and is configured to selectively engage the wall.

2. The wall outlet extender of claim 1, wherein the extendable shaft includes two or more telescoping portions.

3. The wall outlet extender of claim 2, wherein the extendable shaft includes a first telescoping portion having a first diameter and a second telescoping portion having a second diameter, wherein the first diameter is larger than the second diameter.

4. The wall outlet extender of claim 3, wherein the first telescoping portion is configured to internally receive the second telescoping portion in a retracted position.

5. The wall outlet extender of claim 4, wherein the extendable shaft is extendable from about 21 inches to about 34 inches.

6. The wall outlet extender of claim 1, wherein the plug end is rotatable about 360°.

7. The wall outlet extender of claim 1, wherein the engagement portion comprises a non-permanent adhesive, removable putty, or stickable surface.

8. The wall outlet extender of claim 7, wherein the engagement portion is free from any attachment to the wall that traverses or damages the wall surface.

9. The wall outlet extender of claim 1, wherein the outlet end includes an even number of outlets and at least one USB port.

10. The wall outlet extender of claim 1, wherein the outlet end comprises a device cradle configured to hold a device while the device is plugged into the outlet end.

11. The wall outlet extender of claim 1, wherein the wall outlet extender comprises Bluetooth or Wi-Fi connectivity capabilities.

12. An extendable power outlet adaptor, comprising:

a plug selectively configured to insert into a wall outlet;

an extendable shaft that comprises a bend collar is telescopic and rotatable about the plug up to 360°;

one or more outlet receptacles connected to the shaft that are selectively attachable to a position on a wall;

an interchangeable faceplate selectively attached with the one or more outlet receptacles;

an electrical cord portion positioned between the extendable shaft and the plug end; and a device cradle that includes wireless charging technology configured to hold a device and facilitate charging the device.

13. The extendable power outlet adaptor of claim 12, wherein the one or more outlet receptacles are attachable to the wall by temporary adhesive, putty, or stickable surface.

14. The extendable power outlet adaptor of claim 13, wherein the one or more outlet receptacles are free from any attachment to the wall that traverses or damages the wall surface.

15. The extendable power outlet adaptor of claim 12, wherein the one or more outlet receptacles may be removed and repositioned onto the wall.

16. The extendable power outlet adaptor of claim 12, wherein the plug end is replaceable with a different type of plug.

17. The extendable power outlet adaptor of claim 12, wherein the plug end comprises Type A, B, C, D, E, F, G, H, I, J, K, L, M, N or O IEC plug ends, a 120 volt end or a 240 volt end.

18. The extendable power outlet adaptor of claim 12, further comprises at least one USB port.

* * * * *